United States Patent
Shepherd et al.

(10) Patent No.: US 9,098,329 B1
(45) Date of Patent: Aug. 4, 2015

(54) MANAGING WORKFLOWS

(75) Inventors: Joel Shepherd, Seattle, WA (US); Richard Scott Brinkerhoff, Normandy Park, WA (US)

(73) Assignee: Amazon Technologies, Inc., Reno, NV (US)

( * ) Notice: Subject to any disclaimer, the term of this patent is extended or adjusted under 35 U.S.C. 154(b) by 143 days.

(21) Appl. No.: 13/221,688

(22) Filed: Aug. 30, 2011

(51) Int. Cl.
*G06F 9/455* (2006.01)
*G06F 9/46* (2006.01)
*G06F 9/48* (2006.01)

(52) U.S. Cl.
CPC ...... *G06F 9/485* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 5,826,239 A * | 10/1998 | Du et al. | | 705/7.26 |
| 6,263,358 B1 * | 7/2001 | Lee et al. | | 718/100 |
| 6,711,616 B1 * | 3/2004 | Stamm et al. | | 709/226 |
| 6,966,033 B1 * | 11/2005 | Gasser et al. | | 715/738 |
| 7,299,244 B2 * | 11/2007 | Hertling et al. | | 707/694 |
| 2002/0152254 A1 * | 10/2002 | Teng | | 709/100 |
| 2005/0283786 A1 * | 12/2005 | Dettinger et al. | | 718/104 |
| 2006/0167984 A1 * | 7/2006 | Fellenstein et al. | | 709/203 |
| 2008/0086731 A1 * | 4/2008 | Trossman et al. | | 718/100 |
| 2010/0050180 A1 * | 2/2010 | Amsterdam et al. | | 718/104 |
| 2010/0235845 A1 * | 9/2010 | Bates et al. | | 718/105 |
| 2011/0041136 A1 * | 2/2011 | Messier et al. | | 718/105 |
| 2011/0106951 A1 * | 5/2011 | Akiyama et al. | | 709/226 |

\* cited by examiner

*Primary Examiner* — Lewis A Bullock, Jr.
*Assistant Examiner* — Melissa Alfred
(74) *Attorney, Agent, or Firm* — Knobbe Martens Olson & Bear LLP (57) ABSTRACT

Systems and methods are disclosed that facilitate the selection of virtual machine instances to implement each action associated with a specified workflow. Workflows are configured and defined as a series of actions or processes that have various requirements. For each action in a specified workflow, a workflow management component can select virtual machine resources that are best suited to implement the specific action in accordance with the requirements of the action.

30 Claims, 6 Drawing Sheets

MANAGING WORKFLOWS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, instances of a virtual machine or a physical computing device may be configured to provide specific functionality. For example, various computing devices may be associated with different combinations of operating systems or operating system configurations, virtualized hardware resources and software applications to enable a computing device to provide different desired functionalities, or to provide similar functionalities more efficiently. Accordingly, the different configurations of virtual machine instances may be better suited for different types of processing requests.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Generally described, aspects of the present disclosure relate to the management of the implementation of a series of actions or process corresponding to workflows. Specifically, systems and methods are disclosed that facilitate the selection of virtual machine instances to implement each action associated with a specified workflow. Illustratively, workflows are configured and defined as a series of actions or processes that have various requirements in terms of computing device resources, security resources, service levels, financial results, and the like. For each action in a specified workflow, a workflow management component can select virtual machine resources that are best suited to implement the specific action in accordance with the requirements of the action.

Figure 1:
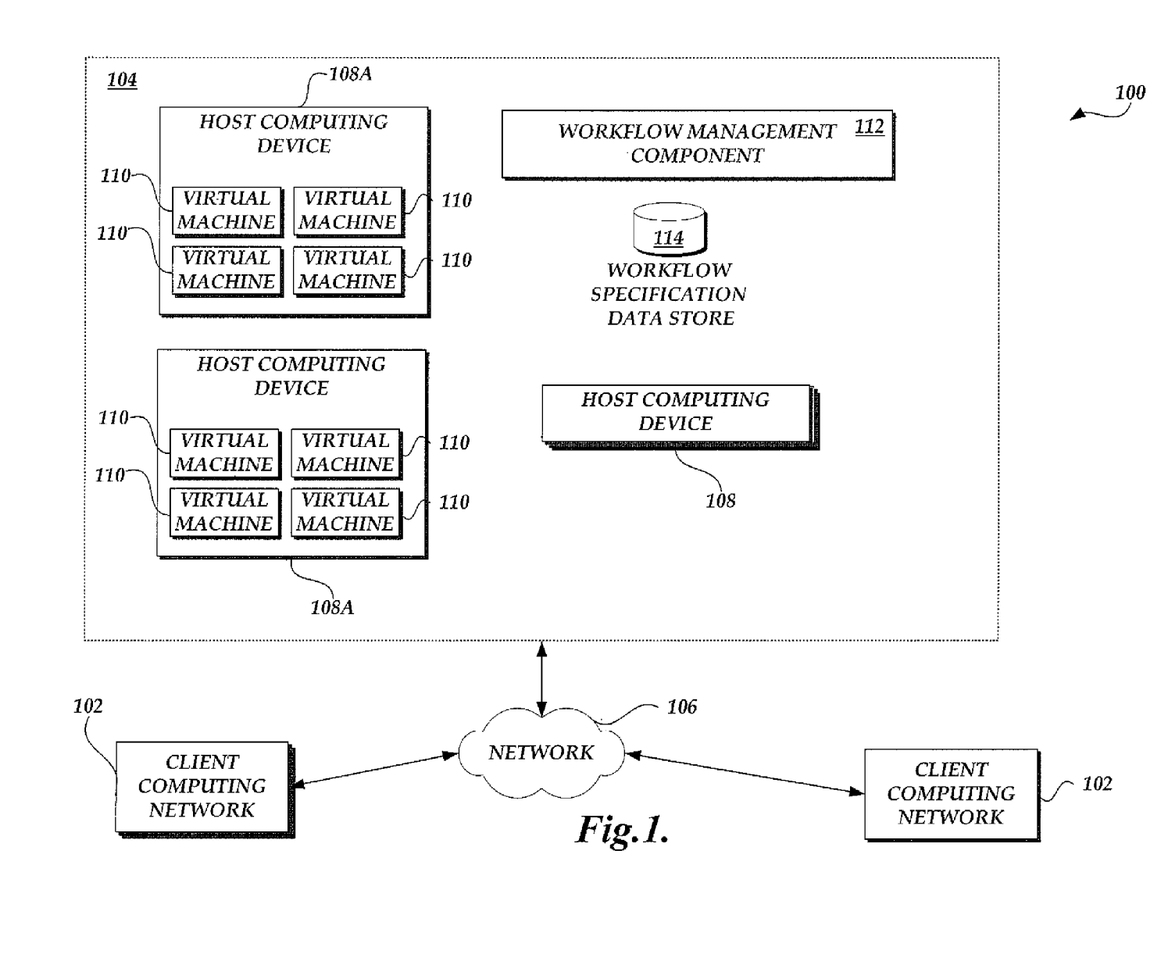
FIG. 1 is a block diagram depicting an illustrative virtual network environment for managing virtual machine instance types including a number of computing device networks, a number of host computing devices, and a workflow management component.

FIG. 1 is a block diagram illustrating an embodiment of a virtual network environment 100. The virtual network environment 100 includes one or more client computing device networks 102 in communication with a virtual network 104 via a communication network 106. In one embodiment, the client computing device networks 102 can correspond to one or more computing devices that are controlled on or behalf of a user or organization that is a customer of a service provider associated with the virtual network 104 (such as a system administrator). The communication network 106 may be, for instance, a wide area network (WAN), a local area network (LAN), or a global communications network.

The virtual network 104 can include multiple physical computing devices, generally referred to as host computing devices 108. In one embodiment, the host computing devices 108 are capable of hosting multiple virtual machine instances 110. At least some of the virtual machine instances 110 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 104 is logical in nature and can encompass host computing devices 108 from various geographic regions. Additionally, although the host computing devices 108 will be discussed with regard to hosted virtual machine instances 110, one or more of the host computing devices may be physical computing devices configured to provide specified functionality in the virtual network 104 without hosting virtual machine instances, generally illustrated as host computing device 108 without virtual machine instances 110 in FIG. 1. Accordingly, reference in the illustrative examples and embodiments to host computing devices 108 or host computing device can include host computing devices hosting virtual machines 110 or not hosting virtual machine instances.

The virtual network 104 also includes a workflow management component 112 for processing requests for processing requests to implement selected workflows. As will be explained in greater detail below with regard to FIGS. 3A-3C, the workflow management component 112 can identify a series of actions that are implemented in a specified workflow. Additionally, the workflow management component 112 can select one or more virtual machine instances to implement each action in the series of actions based on matching processing requirements for each action. It should be appreciated that, although the workflow management component 112 is depicted for the purpose of example as a single, stand alone logical component in illustrative FIG. 1, the routines and steps performed by the workflow management component 112 may be distributed among any number of components and executed in hardware or software. For example, multiple workflow management components 112 may be implemented in the virtual network 104, such in a number of virtual machine instances 110. Additionally, although the workflow management component 112 is illustrated as logically associated within the virtual network 104, the workflow management component 112 may be implemented in a separate networked environment, in conjunction with client computing device networks 102, or otherwise integrated into other components/systems of the virtual network 104. Illustrative components of the workflow management component 112 will be described with regard to FIG. 2.

With continued reference to FIG. 1, the virtual network 104 can further include a workflow specification data store 114 for maintaining, at least in part, information related to the definition of workflows into a series of actions or processing steps. Additionally, the workflow specification data store 114 can maintain, at least in part, information related to preferences for the requesting client computing device networks 102, such as service level agreement terms, financial criteria, and the like. Illustratively, the workflow specification data store 114 may correspond to network attached storage (NAS), database servers, local storage, or other storage configurations which may be implemented in a centralized or distributed manner. Additionally, although the workflow specification data store 114 is illustrated as a single data store, one skilled in the relevant art will appreciate that the workflow specification data store may be integrated or combined with one or more of the data stores provide additional or alternative functionality to the virtual network 104.

Figure 2:
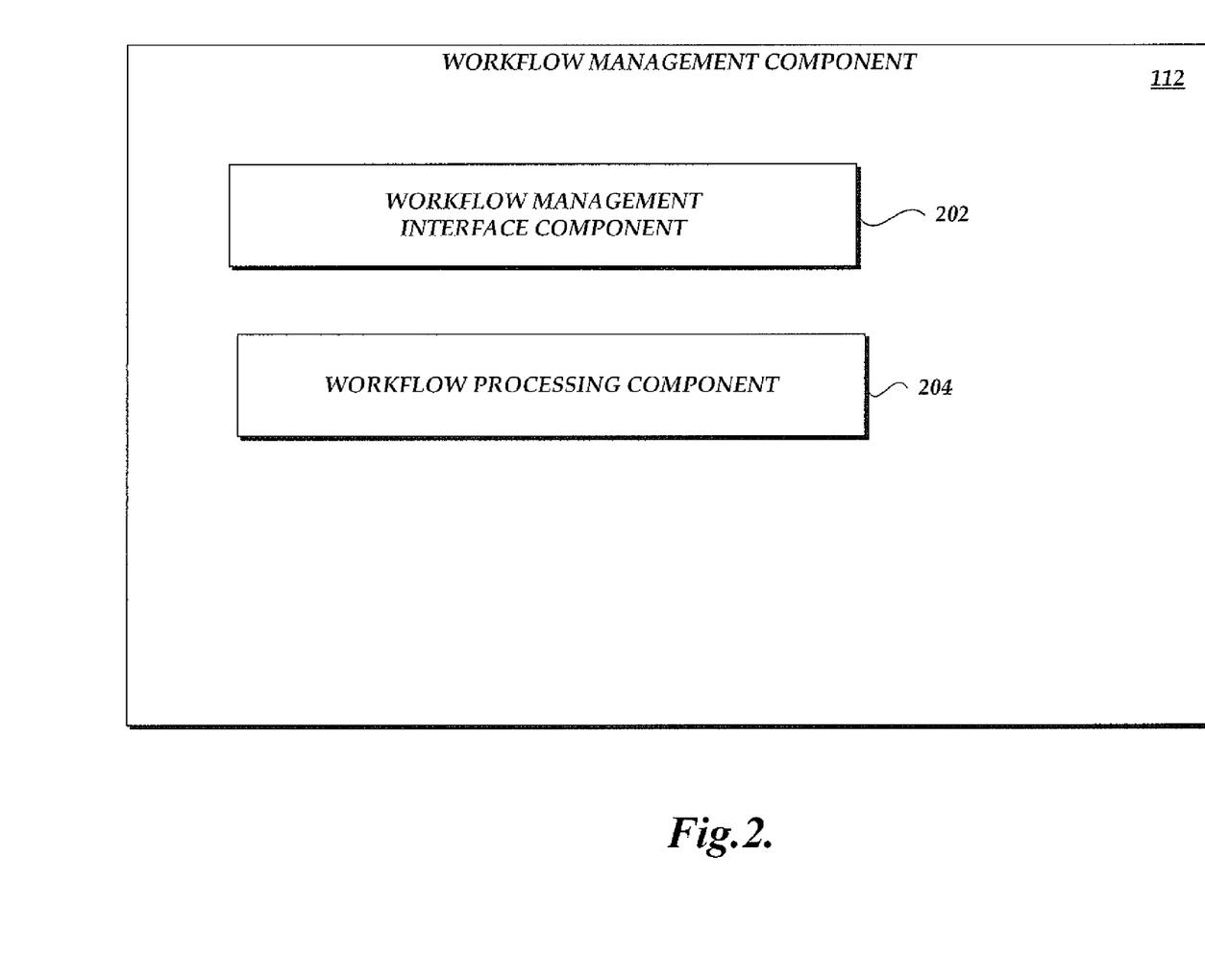
FIG. 2 is a block diagram illustrating a subset of components of a workflow management component for utilization in the virtual network environment of FIG. 1.

FIG. 2 illustrates selected modules or components in a representative workflow management component 112. Illustratively, the workflow management component 110 may be associated with computing resources such as central processing units and architectures, memory (e.g., RAM), mass storage or persistent memory, graphics processing units, communication network availability and bandwidth, etc. Generally, however, the workflow management component 110 may include one or more processing units, such as one or more CPUs. The workflow management component 110 may also include system memory, which may correspond to any combination of volatile and/or non-volatile storage mechanisms. The system memory may store information that provides an operating system component, various program modules, program data, or other components. The workflow management component 110 performs functions by using the processing unit(s) to execute instructions provided by the system memory. The workflow management component 110 may also include one or more types of removable storage and one or more types of non-removable storage. Still further, the workflow management component 110 can include communication components for facilitating communication via wired and wireless communication networks, such as communication network 106.

As illustrated in FIG. 2, the workflow management component 112 can include, among other hardware or software components, a workflow management interface component 202 for facilitating the receipt of requests to define or implement workflows from client computing device networks 112. The workflow management interface component 202 can also facilitate the receipt of information regarding availability information for virtual machine instances 110 or host computing devices 108 that may implement one or more actions associated with a specified workflow. Illustratively, the workflow management interface component 202 can facilitate interaction with client computing devices, host computing devices 108 and virtual machine instances 110 via application programming interfaces ("APIs"). The workflow management component 112 can also include a workflow processing component 204 for processing requests for implementation of specified workflows. Specifically, the workflow processing component 204 can attempt to match one or more processing requirements of actions in workflow with resource availability information of virtual machine instances 110 (instantiated or yet to be instantiated) that are capable of implementing the respective action. One skilled in the relevant art will appreciate that the illustrated components 202 and 204 may be implemented as stand along components or modules. Additionally, one or more of the modules 202 and 204 implemented into other components or otherwise combined. Still further, as previously discussed, the workflow management component 112 may be implemented on one or more physical devices, one or more virtual machine instances or a combination thereof.

Figure 3A:
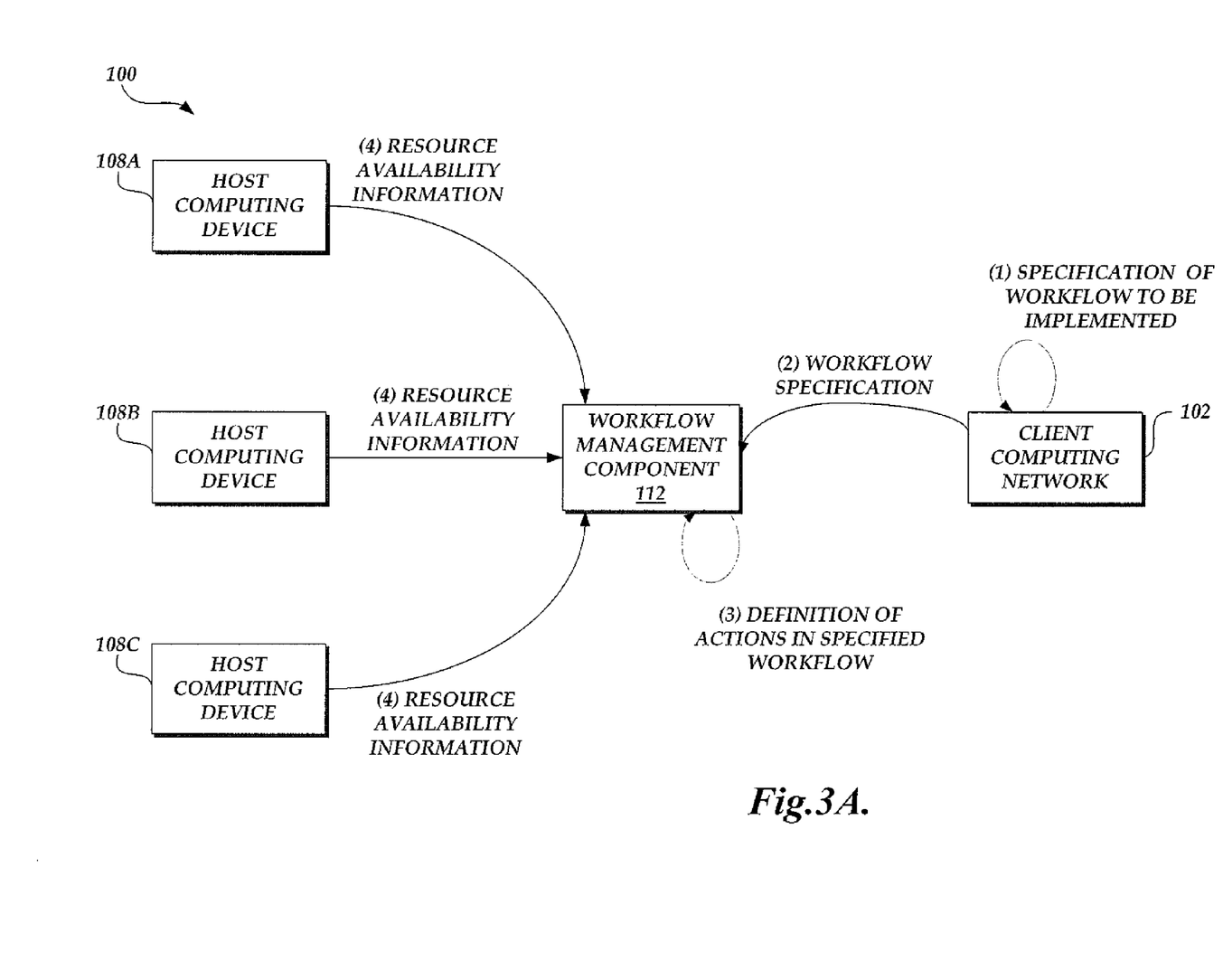
FIGS. 3A-3C are simplified block diagrams of the virtual network environment of FIG. 1 illustrating the processing of a series of actions corresponding to a specified workflow on one or more host computing devices.
Figure 3B:
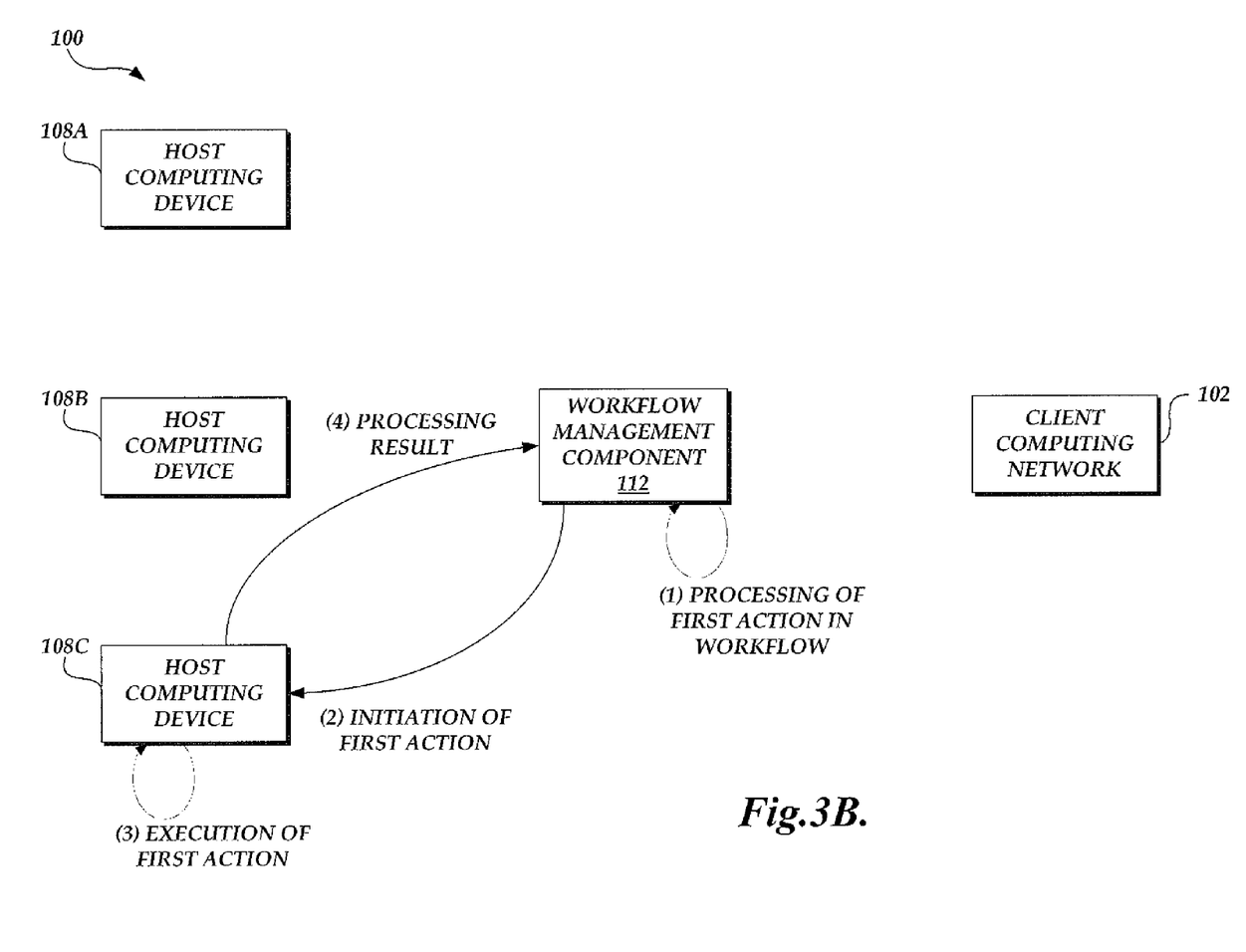
Figure 3C:
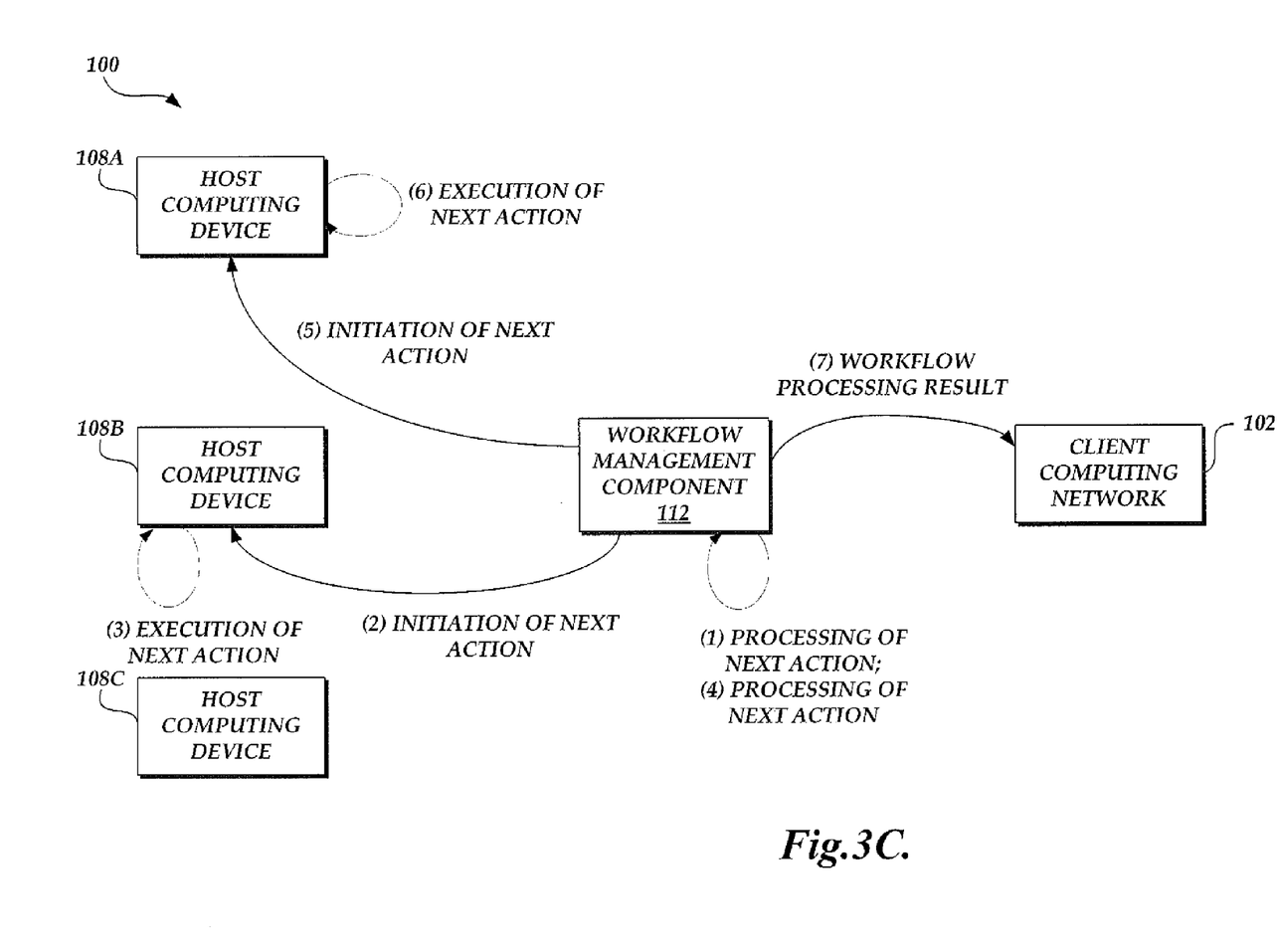

Turning now to FIGS. 3A-3C, a simplified block diagram of the virtual network environment 100 of FIG. 1 illustrating the selection and execution of workflows on one or more virtual machine instances 110 will be described. For purposes of illustration, many of the components of the virtual network environment 100 have been omitted. However, one skilled in the relevant art will appreciate that the illustrated interaction between components may utilize the omitted components or additional components not previously illustrated in FIG. 1. Still further, embodiments disclosed in FIGS. 3A-3C reference host computing devices 108 that may be hosting virtual machine instances 110, the disclosed embodiments and examples may be implemented with at least some portion of the host computing devices 108 not hosting virtual machine instances.

With reference to FIG. 3A, in one embodiment, the client computing network 102 can process and initiate a request to the workflow management component 110 to authorize or request the initiation of a workflow (1). The request can identify a specific workflow or set of workflows. The request can also identify one or more of the criteria that the workflow management component 112 can utilize to selection the virtual machine instances 110 that will implement the actions associated with the specified workflow. For example, the request can include a specification of a maximum financial cost or a financial cost category that a customer would like applied in selecting the virtual machine instances 110 that will implement the specified series of actions.

Upon receipt of the workflow specification and any additional information, the workflow management component 112 defines (or obtains a definition) of a series of actions that will be implemented in the specified workflow (3). For example, assume a customer has selected a customer sales workflow to be implemented. A first action may involve the aggregation of data from multiple sources, such as retail outlets. A second action may involve the processing of the aggregated data and the generation of additional data, such as summary of sales to date or an extrapolation of the sales data for sales projection. A third action may involve the generation of user interfaces that allow a set of client computing devices to access and manipulate the aggregated and processed data. In this basic embodiment, the workflow management component 112 could identify the three actions as the series of actions that correspond to the specified workflow.

With continued reference to FIG. 3A, the workflow management component 112 can also obtain resource availability information (4) for one or more virtual machine instances 110 or host computing devices 108A, 108B, 108C. The virtual machine instances 110 may have been previously instantiated for utilization by the customer or third party. Alternatively, at least a portion of the virtual machine instances 110 may correspond to virtual machine instances that can be instantiated by a manager server computer system (not illustrated) running within the virtual network 104. Illustratively, the resource availability information may correspond to information related to the resources that can be made available to the customer, such a processing, memory, network bandwidth, and the like. The resource availability information can also correspond to information related to cost information that will be associated with the execution of the action. For example, a virtual machine instance 110 that is at 10% capacity may be able to offer a different financial cost than a virtual machine instance 110 that is 85% capacity. Still further, the resource availability may also include security information associated with the type of security or a security rating for the virtual machine instance. The resource availability information can also correspond to location information that may provide a physical location or a logical network location of the virtual machine instance. One skilled in the relevant art will appreciate that additional or alternative resource availability information may also be provided.

With reference now to FIG. 3B, in one embodiment, the workflow management component 112 selects the first (or next) action or process in the series of actions and processes the action (1). The processing of the action can include a determination of the processing requirements for the action. For example, processing the action may require minimal computing device resources, such as a minimal number of processing units, processing unit speeds, memory capacity, available network bandwidth, and the like. The processing requirements may also specify security requirements, such as types of encryption or security certifications. Still further, the processing requirements can specify geographic criteria that may need to be satisfied. For example, an action that requires the transmission of large amounts of data may specify geographic criteria such that a virtual machine instance processing the data may be geographically proximate to the data source to improve performance or mitigate data losses over a communication network. Based on the resource availability information previously collected by the workflow management component 112, the workflow management component attempts to match an available virtual machine instance 110 with the action.

As illustrated in FIG. 3B, the workflow management component 112 can then cause the instantiation of the requested action (2), such as a virtual machine instance 110 on host computing device 108C. In alternative embodiments, one or more of the host computing devices 108A-108C may periodically poll the workflow management component 112 to determine whether there are actions that can be executed by the host computing device. Accordingly, with reference to the illustrative example of FIG. 3B, the initiation of the first action (2) by the workflow management component 112 may be reactive to the polling by the host computing device 108A. Based on the information provided by the workflow management component 112 (in conjunction with other components), one or more of the selected virtual machine instances 110 execute the first action (3). Additionally, the virtual machine instances 110 can transmit a processing result (4). The processing result can be in the form of notifications regarding the completion of the task. The processing result can also be in the form of data generated by the virtual machine instance or other information specified for the selected workflow.

Turning now to FIG. 3C, in one embodiment, the processing of the first action (FIG. 3B) may be prerequisite to processing additional actions. In other embodiments, two or more the identified actions may be processed in parallel or at least without dependencies to each action. As illustrated in FIG. 3C, upon the completion of the first action, the workflow management component 112 process the next action (1) and selects a virtual machine instance 110 for implementing the next action. As previously described, the workflow management component 112 can utilize the processing requirement information and virtual machine resource availability information to select the virtual machine instance. Illustratively, the workflow management component 112 can obtain updated virtual machine resource availability information or check for updates. Alternatively, the workflow management component 112 can utilize previously collected resource availability information. Based on the information provided by the workflow management component 112 (in conjunction with other components), one or more of the selected virtual machine instances 110 execute the next action (2) and (3).

For purposes of illustration, however, the virtual machine instances 110 does not necessarily transmit a processing result prior to the workflow management component 112 selecting and processing the next action (4). As previously described, the workflow management component 112 can utilize the processing requirement information and virtual machine resource availability information to select the virtual machine instance that will implement the next action. Based on the information provided by the workflow management component 112 (in conjunction with other components), one or more of the selected virtual machine instances 110 execute the next action (5) and (6).

Figure 4:
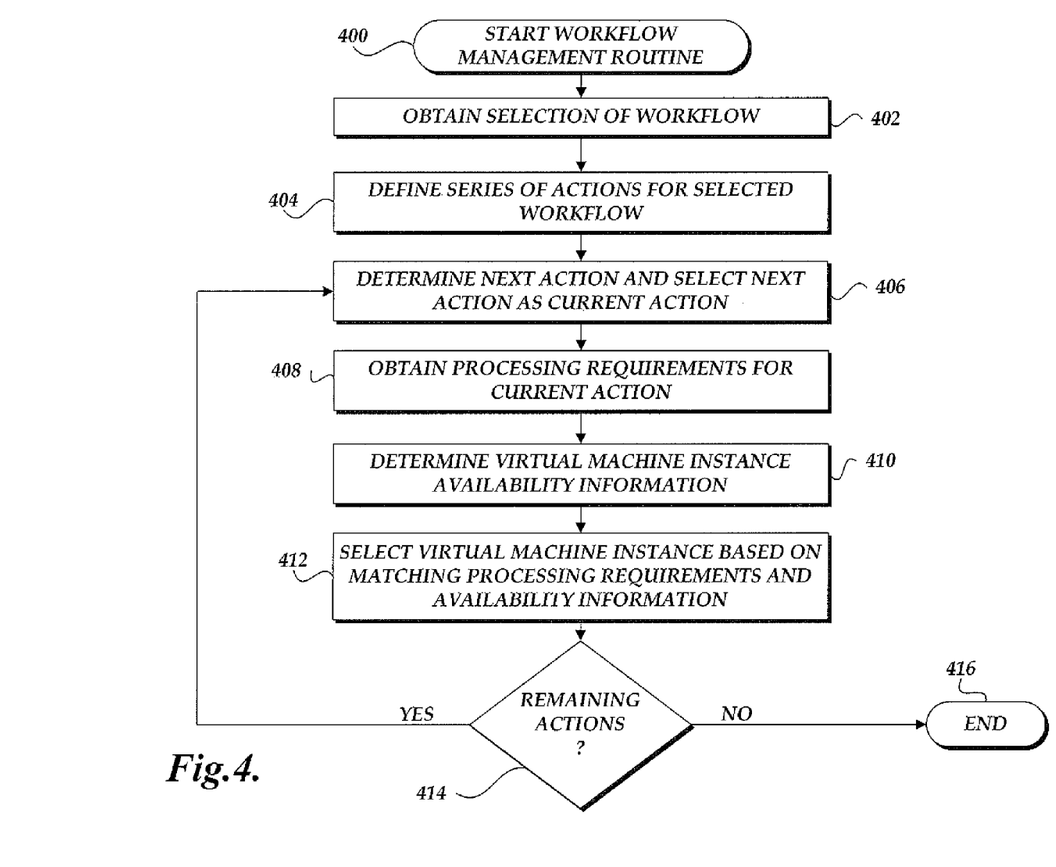
FIG. 4 is a flow diagram illustrative of a workflow management routine implemented by a workflow management component.

Turning to FIG. 4, a flow diagram illustrative of a workflow management routine 400 implemented by the workflow management component 112 will be described. While routine 400 will be described with regard to implementation by the workflow management component 112, one skilled in the relevant art will appreciate that routine 400 may be implemented by other components of the virtual network 104.

At block 402, the workflow management component 112 obtains a request for execution of a workflow. As previously described, in one embodiment, the request can identify a specific workflow or set of workflows. For example, a specific customer may have specified a number of workflows that can be requested via one or more custom API calls. Additionally, the request can identify one or more criteria that the workflow management component 112 can utilize to selection the virtual machine instances 110 that will implement the actions associated with the specified workflow. For example, the request can include a specification of a maximum financial cost or a financial cost category that a customer would like applied in selecting the virtual machine instances 110 that will implement the specified series of actions. In another example, the request can include a service level category that the workflow management component 112 will attempt to achieve in implementing the workflows. In still a further embodiment, the request can include the specification of a workflow that has not been previously specified or defined. The definition can be accomplished via one or more API calls or by reference to a definition stored in the virtual network 104 or other network location.

At block 404, the workflow management component 112 defines a series of actions for the selected or specified workflow. In one embodiment, the series of actions may be previously defined by the workflow management component 112 (or component). In another embodiment, the workflow management component 112 may dynamically process the workflow to identify a series of actions that need to be executed. For example, the workflow management component 112 can analyze code associated with the definition of the workflow and identify one or more processes that will be implemented.

Still further, the workflow management component 112 can utilize historical data related to the current workflow or substantially similar workflows to identify the series of action. For example, assume that the workflow management component 112 has obtained a request related to a previously undefined data processing workflow. The workflow management component 112 can utilize information associated with other data processing workflows to assist in the identification for the actions that would be executed in the requested workflow. In another example, assume that the workflow management component 112 receives a request to implement a sales data encryption workflow that has never been implemented by a particular customer. The workflow management component 112 can utilize historical information associated with the implementation of the data encryption workflow by other customers to determine the series of actions.

At block 406, the routine 400 begins a loop for processing all of the series of actions in a defined workflow. Specifically, at block 406, the workflow management component 112 determines what will be the next action (or set of actions) and selects the next action(s) as the current action. In a first iteration of routine 400, the workflow management component 112 can determine that the next action may be the first action in the first iteration of routine 400. In embodiments in which the series of actions are dependent on the previous action being completed, the workflow management component 112 can determine that the next action is the next subsequent action or some other identified action in the series of action. In other embodiments in which at least a portion of the series of actions are not dependent, the workflow management component 112 can select multiple actions to be executed or implemented in parallel. The determination of whether to implement action in series may also be dependent on available host computing device resources.

At block 408, the workflow management component 112 obtains the processing requirements for the current action. As previously described, the processing requirements can correspond to various criteria associated with the action, a desired output or the customer requesting the action. In one example, the processing requirements can include a specification computing device resources, such as a minimal number of processing units, processing unit speeds, memory capacity, available network bandwidth, and the like. The processing requirements can be in the form of minimum requirements, maximum requirements, optimal requirements and the like. In another example, the processing requirements may also specify security requirements, such as types of encryption or security certifications. In a further example, the processing requirements can specify geographic criteria that may need to be satisfied. For example, an action that requires the transmission of large amounts of data to customer may specify geographic criteria such that a virtual machine instance processing the data may be geographically proximate to destination of the data (e.g., the consumer of the data).

At block 410, the workflow management component 112 determines virtual machine instance resource availability information for one or more virtual machine instance(s) that will implement the current action. As previously described, the resource availability information can also correspond to information related to cost information that will be associated with the execution of the action. For example, a virtual machine instance 110 that is at 85% capacity may be offered at a different financial cost than a virtual machine instance 110 that is 10% capacity. Still further, the resource availability may also include security information associated with the type of security or a security rating for the virtual machine instance. The resource availability information can also correspond to location information that may provide a physical location or a logical network location of the virtual machine instance. One skilled in the relevant art will appreciate that additional or alternative resource availability information may also be provided.

At block 412, the workflow management component 112 determines a virtual machine instance (or set of virtual machine instances) that will implement the current action. Specifically, the workflow management component 112 can select the virtual machine instance(s) based on matching the processing requirements of the current action with the resource availability information associated with one or more virtual machine instances 110 in the virtual network 104. At decision block 414, the workflow management component 112 determines whether there are additional actions for the specified workflow. If so, the routine 400 returns to block 406 to process the next action in the set of actions. Additionally, if a processing result is required, the routine 400 will wait for receipt of confirmation of the processing result of the previous action. Alternatively, once no additional actions are left to be processed, the routine 400 terminates at block 416.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing workflows, comprising:
   obtaining a request for a specified workflow to be implemented, wherein one or more actions associated with the workflow is not predefined;
   defining the specified workflow into a series of two or more actions to be executed by one or more of a plurality of virtual machine instances based, at least in part, on information from a different workflow;
   for each defined action of the series of two or more actions, performing the steps of:
      obtaining one or more processing requirements for the action, wherein the one or more requirements specify a maximum financial cost and at least one of types of encryption or security certifications,
      automatically determining a processing category for the action based, at least in part, on the one or more processing requirements for the action, wherein at least two of the actions of the series of actions have different processing categories;
      automatically determining resource availability information for one or more of the plurality of virtual machine instances, wherein the resource availability information identifies a remaining processing capacity and a current utilization of computing resources of one or more available virtual machine instances of the plurality of virtual machine instances;
      automatically determining financial cost information associated with the execution of the action on each of the available virtual machine instances, wherein the financial cost information is dynamically calculated for each available virtual machine instance and is based, at least in part, on a function of the current utilization of computing resources of a particular virtual machine instances in relation to the remaining capacity of the particular virtual machine instance;
      automatically selecting a virtual machine instance based, at least in part on the processing category and the financial cost information associated with the action; and
      causing the action to be executed by the selected virtual machine instance.

2. The computer-implemented method as recited in claim 1, wherein the computing resources correspond to one of processing resources, memory resources, or communication network resources.

3. The computer-implemented method as recited in claim 1, wherein the one or more processing requirements for the action further comprise financial cost criteria corresponding to a maximum financial cost not to be exceeded, the financial cost incurred by a customer.

4. The computer-implemented method as recited in claim 1, wherein the geographic location criteria includes a location of data to be inputted as part of the execution of the action, a location of information utilized or a location of data to be provided as a result of execution of the action.

5. The computer-implemented method as recited in claim 1, wherein defining the specified workflow includes obtaining a manual definition of a series of actions.

6. The computer-implemented method as recited in claim 1, wherein defining the specified workflow includes automatically defining the series of actions.

7. The computer-implemented method as recited in claim 6, wherein automatically defining the series of actions includes:
   obtaining historical information related to the workflow; and
   utilizing the historical information to define the series of actions without input from a user.

8. The computer-implemented method as recited in claim 7, wherein the historical information corresponds to a previous execution of the specified workflow.

9. The computer-implemented method as recited in claim 7, wherein the historical information corresponds to a related workflow that has been previously executed.

10. A, system comprising:
   a workflow management component comprising at least one hardware processor and configured to:
      define a specified workflow into a series of two or more actions based, at least in part, on information from a different workflow, wherein the one or more actions of the specified workflow is not predefined;
      for each action of the series of two or more actions
         obtain processing requirements for the action, wherein the processing requirements define a maximum financial cost and at least one of types of encryption or security certifications;
         determine a processing category for the action based, at least in part, on the processing requirements for the action, wherein two or more of the actions of the series of actions are associated with different processing categories;
         determine resource availability information for computing resources of one or more computing devices, wherein the resource availability information identifies a remaining processing capacity and a current utilization of available computing resources of the one or more computing devices;
         determine financial cost information associated with the execution of the action by the available computing resources of the one or more computing devices, wherein the financial cost information is dynamically calculated for the available computing resources and is based, at least in part, on a function of the current utilization of available computing resources in relation to the remaining capacity of the available computing resources; and
         cause the action to be implemented based, at least in part, on the determined processing category and the financial cost information.

11. The system as recited in claim 10, wherein the processing category corresponds to a category associated with a virtual machine instance.

12. The system as recited in claim 11, wherein the category associated with the virtual machine instance corresponds to a level of processing expected to be implemented.

13. The system as recited in claim 10, wherein the processing category corresponds to categories associated with computing device resources.

14. The system as recited in claim 10, wherein the processing category corresponds to categories associated with service levels.

15. The system as recited in claim 10, wherein the workflow management component is further configured to obtain a manual definition of the specified workflow to be implemented by virtual machine instances.

16. The system as recited in claim 15, wherein defining the specified workflow includes obtaining a manual definition of a series of actions.

17. The system as recited in claim 15, wherein defining the specified workflow includes automatically defining the series of actions.

18. The system as recited in claim 17, wherein automatically defining the series of actions includes:
obtaining historical information related to the workflow; and
utilizing the historical information to define the series of actions without input from a user.

19. The system as recited in claim 10, wherein causing the action to be implemented based, at least in part, the determined processing category includes causing the action to be implemented on a virtual machine instance hosted by a host computing device.

20. A non-transitory computer-readable medium having computer-executable instructions that when executed instruct a processor to perform a method comprising:
obtaining a request for a workflow to be implemented, wherein the workflow can be implemented as a series of two or more actions, wherein one or more of the actions is not predefined;
defining the one or more actions for the workflow to be executed by a computing device based, at least in part, on information from a different workflow;
for each action of the series of two or more actions, performing the steps of:
obtaining processing requirements for the action, wherein the processing requirements define a maximum financial cost and at least one of types of encryption or security certifications;
determining a processing category for the action based, at least in part, on the processing requirements for the action, wherein at least two of the actions of the series of actions have different processing categories;
determining resource availability information for computing resources of one or more computing devices, wherein the resource availability information identifies a remaining processing capacity and a current utilization of available computing resources of the one or more computing devices;
determining financial cost information associated with the execution of the action by the available computing resources of the one or more computing devices, wherein the financial cost information is dynamically calculated for the available computing resources and is based, at least in part, on a function of the current utilization of available computing resources in relation to the remaining capacity of the available computing resources; and
causing the action to be implemented by a computing device based, at least in part, on the processing category for the action and the financial cost information, wherein at least two of the actions are implemented by different computing devices based, at least in part on, the different processing categories corresponding to the at least two of the actions.

21. The computer-readable medium as recited in claim 20, wherein the processing requirements for the action include a specification of attributes corresponding to one of processing resources, memory resources, or communication network resources.

22. The computer-readable medium as recited in claim 20, wherein the processing requirements for the action include a specification of a maximum financial cost not to be exceeded, the financial cost incurred by a customer.

23. The computer-readable medium as recited in claim 20, wherein the processing requirements for the action include a specification of attributes related to at least one of a location of data to be inputted as part of the execution of the action or a location of data to be provided as a result of execution of the action.

24. The computer-readable medium as recited in claim 20, wherein obtaining a specification of a workflow includes obtaining a manual definition of the series of actions.

25. The computer-readable medium as recited in claim 20, wherein obtaining a specification of a workflow includes automatically defining the series of actions.

26. The computer-readable medium as recited in claim 25, wherein automatically defining the series of actions includes:
obtaining historical information related to the workflow; and
utilizing the historical information to define the series of actions without input from a user.

27. The computer-readable medium as recited in claim 26, wherein the historical information corresponds to a previous execution of the specified workflow.

28. The computer-readable medium as recited in claim 26, wherein the historical information corresponds to a related workflow that has been previously executed.

29. The computer-readable medium as recited in claim 20, wherein causing individual actions to be implemented by a computing device based, at least in part, on the processing category for the action and the financial cost information includes causing at least one action in the series of actions to be implemented on a virtual machine instance.

30. The method of claim 1, wherein the one or more processing requirements are obtained from a user.

* * * * *

UNITED STATES PATENT AND TRADEMARK OFFICE
CERTIFICATE OF CORRECTION

| | | |
|---|---|---|
| PATENT NO. | : 9,098,329 B1 | Page 1 of 1 |
| APPLICATION NO. | : 13/221688 | |
| DATED | : August 4, 2015 | |
| INVENTOR(S) | : Joel Shepherd et al. | |

It is certified that error appears in the above-identified patent and that said Letters Patent is hereby corrected as shown below:

In the claims

In column 9 at lines 39-40, In Claim 1, change "particular-virtual" to --particular virtual--.

In column 10 at line 14, In Claim 10, change "A," to --A--.

Signed and Sealed this
Nineteenth Day of April, 2016

Michelle K. Lee
*Director of the United States Patent and Trademark Office*